United States Patent
Pilch

[15] 3,653,131
[45] Apr. 4, 1972

[54] EXCAVATING APPARATUS

[72] Inventor: John S. Pilch, Ware, Mass.
[73] Assignee: Ware Machine Works, Inc., Ware, Mass.
[22] Filed: Mar. 24, 1970
[21] Appl. No.: 22,156

[52] U.S. Cl..................................37/1, 172/797, 214/138, 214/141
[51] Int. Cl. ...........................................E02f 3/64
[58] Field of Search..................214/768, 138, 138 B, 138 C, 214/141; 172/797; 37/118 R, 118 A

[56] References Cited

UNITED STATES PATENTS

| | | | |
|---|---|---|---|
| 2,924,345 | 2/1960 | Bodin | 214/145 |
| 3,289,866 | 12/1966 | Emery | 214/138 |
| 2,802,585 | 8/1957 | Morin | 214/147 G |

FOREIGN PATENTS OR APPLICATIONS 1,308,911   12/1961   France................................37/118 R

*Primary Examiner*—Gerald M. Forlenza
*Assistant Examiner*—Jerold M. Forsberg
*Attorney*—Robert L. Thompson

[57] ABSTRACT

An excavating apparatus adapted for use with a grader, backhoe, loader or the like which includes an excavating implement supported from the end of a longitudinal member by an implement supporting means which is movable about a first pivot means having an axis extending in a direction transverse to the length of the longitudinal member. The excavating implement is mounted for movement about a second pivot means having an axis which extends in the plane of the longitudinal direction of the longitudinal member. The second pivot means extends between the implement supporting means and the lower part of the rear portion of the implement and this second pivot means is adjacent to the ground when the leading edge of the implement rests on the ground. The apparatus also includes means for moving the implement supporting means about the first pivot means and means for moving the implement about the second pivot means. In a preferred embodiment the means for moving the implement about the second pivot means includes a hydraulically operated reciprocating means, such as a cylinder and ram, which has one end pivotally attached to one of the excavating implement and the implement supporting means and the other end pivotally attached to the other of the implement and the implement supporting means. Also, preferably, at least the major portion of said means for moving the implement is located in the space between the rear portion of the excavating implement and the forward portion of the implement supporting means.

9 Claims, 8 Drawing Figures

INVENTOR
JOHN S. PILCH
BY
Dike, Thompson & Bronstein
ATTORNEYS

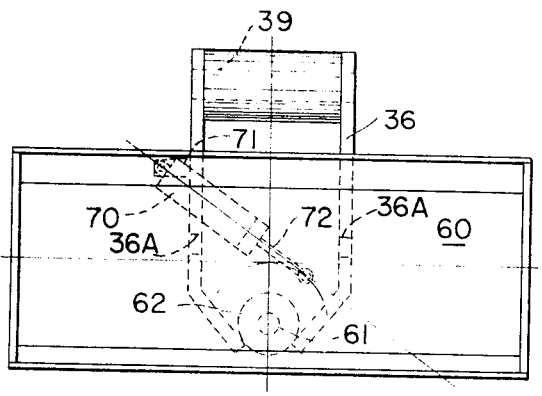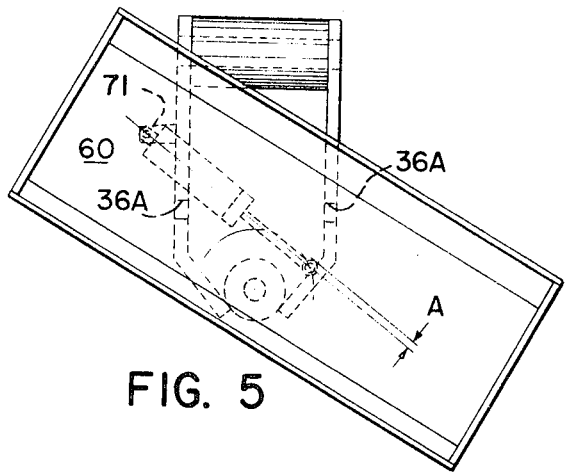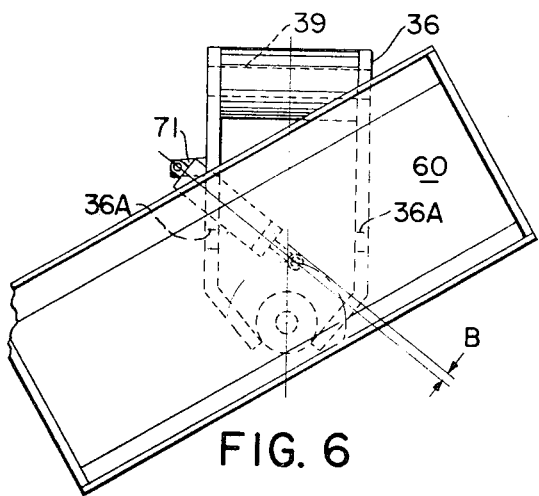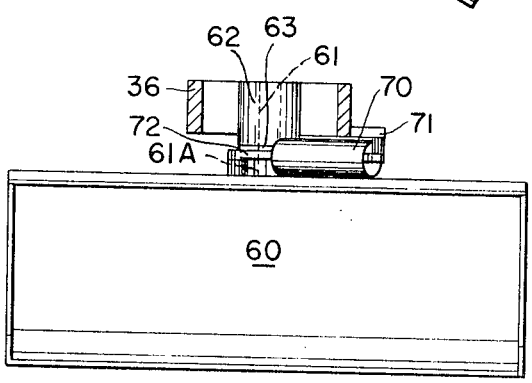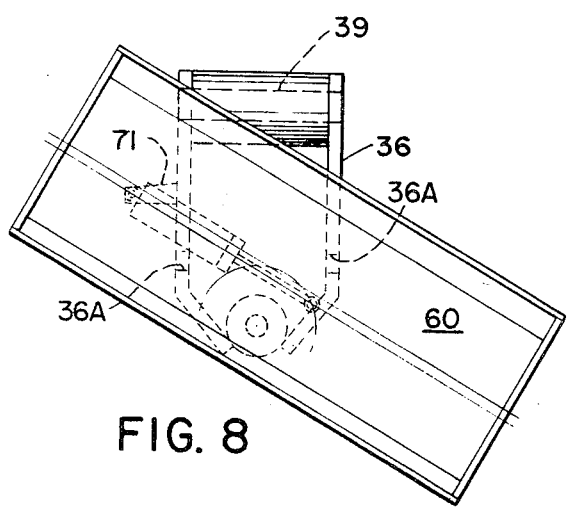

3,653,131

EXCAVATING APPARATUS

BACKGROUND OF THE INVENTION

This invention relates to earth handling apparatus such as graders, backhoes and loaders which include an excavating implement supported from a longitudinal member, such as a dipperstick, for pivotal movement about a first axis which is transverse to the length of the longitudinal member so that the angle of the leading edge of the excavating implement may be adjusted to the surface of the ground in one direction during the excavating operation. It also relates to such apparatus in which the excavating implement is supported for pivotal movement about a second axis which extends in the plane of the longitudinal direction of the longitudinal member so that the angle of the leading edge of the excavating implement may be adjusted to the surface of the ground in another direction during the excavating operation.

Backhoes and graders have been proposed which provide for such pivotal movements of the excavating implement but they are very expensive to manufacture and in many of them the means for rotating the excavating implement about the second axis is not protected against contact by the dirt, stones or other material which is being excavated.

Examples of the prior art are found in the following United States Pat. Nos.:

3,343,693 Sept. 26, 1967 Becker; 3,197,049 July 27, 1965 Schwing; 3,033,394 May 8, 1962 Kashergen; 3,231,116 Jan. 25, 1966 Powell; 3,247,986 Apr. 26, 1966 Eyler et al.; 3,289,866 Dec. 6, 1966 Emery; 2,496,696 Feb. 7, 1950 Burner; 2,927,706 Mar. 8, 1960 Mark; 2,924,345 Feb. 9, 1960 Bodin.

SUMMARY OF THE INVENTION

One object of this invention is to provide a new and improved excavating apparatus in which the excavating implement has pivotal movements about two such axes which is economical to manufacture.

Another object of the invention is to provide such an excavating apparatus in which the means for rotating the excavating implement about the second axis is protected against contact by the material which is being excavated.

A further object of the invention is to provide such an apparatus in which the means for rotating the excavating implement about the second axis consists of a hydraulically operated cylinder and ram.

Yet another object of the invention is to provide a new and improved excavating apparatus in which the excavating implement is movable about two axes.

Other objects and advantages of the invention will be apparent from the following description taken in conjunction with the accompanying drawings.

In general, the excavating apparatus of this invention comprises a longitudinal member, such as a dipperstick, an excavating implement supporting means for supporting the excavating implement, first pivot means for mounting the implement supporting means for movement about an axis which is substantially transverse to the length of the longitudinal member at a location adjacent to one end thereof, means for moving the implement supporting means about the first pivot means, second pivot means extending between the implement supporting means and a lower part of the rear portion of the implement for supporting the implement adjacent to the ground line when the leading edge of the implement rests on the ground and means for moving the implement about the second pivot means.

Preferably the axis of the second pivot means is substantially normal to the direction of the leading edge of the excavating implement when the implement is viewed from the top and the second pivot means comprises a pin having an enlarged portion secured to the implement, a bearing secured to the implement supporting means and a washer which encircles the pin with one side located adjacent to the end of the enlarged portion and the other side located adjacent to one end of the bearing.

By thus locating the second pivot means adjacent to the ground line and by using a washer as a part of the second pivot means a major portion of the shock loads imposed upon the excavating implement as it is advanced into the ground during the excavating operation is absorbed by the washer. Consequently much less expensive second pivot means may be used than in the prior art.

The means for moving the implement about the second pivot means preferably comprises a single hydraulically operated reciprocating means such as a cylinder and a ram with the cylinder pivotally attached to one of the implement and the implement supporting means and the ram pivotally attached to the other of the implement and the implement supporting means. Accordingly, when the leading edge of the excavating implement is horizontal and the implement is viewed from the front, the cylinder and ram are concealed from view by the excavating implement and this protects them against contact by the material which is being excavated as the excavating implement is advanced along and into the ground.

The cylinder and ram are so located that, when the leading edge of the excavating implement is horizontal and the implement is viewed from the front, the longitudinal center line of the cylinder and ram is tangent to the arc described by the axis of the pivotal attachment of the hydraulically operated reciprocating means to the implement during rotation of the implement about the second pivot means.

In addition the cylinder and ram are so located that when the leading edge of the excavating implement is horizontal and the implement is viewed from the front, one end of the combined cylinder and ram is located to one side of the vertical center line of the implement and the other end thereof is located at the other side of the vertical center line. Also when the excavating implement is viewed from the front and the implement is rotated about the second pivot means, at one stage of such rotation the longitudinal center line of the cylinder and ram is parallel to or coincides with the longitudinal center line of the implement.

In addition the axis of the second pivot means extends in a direction which is substantially normal to the axis of the first pivot means when the supporting means is viewed from the top and the axes of the first and second pivot means are located in planes which are parallel to each other when the supporting means is viewed from the side.

Furthermore, preferably at least the major portion of the combined cylinder and ram is positioned between the rear portion of the excavating implement and the forward portion of the implement supporting means and, when the leading edge of the excavating implement is horizontal and the implement is viewed from the top, the longitudinal center line of the cylinder and ram is located in a plane which is substantially parallel to the leading edge of the implement.

Use of such a single reciprocating means which is thus located provides a means for moving the excavating implement about the second pivot means which is much more economical to manufacture than the complicated gear devices and the devices having a plurality of cylinders and rams of the prior art.

BRIEF DESCRIPTION OF THE DRAWINGS

In the drawings:

FIG. 4 is an elevation looking from right to left at the excavating implement and associated parts shown in FIG. 1;

FIG. 5 is a view like FIG. 4 showing the excavating implement moved in one direction from the position of FIG. 4;

FIG. 6 is a view like FIG. 4 showing the excavating implement moved in the other direction from the position of FIG. 4;

FIG. 7 is an enlarged section taken on the line 7—7 of FIG. 1;

FIG. 8 is a view like FIG. 4 showing the excavating implement moved to a position in which the longitudinal center line of the cylinder and ram is parallel to the longitudinal center line of the excavating implement when viewed from the front.

DESCRIPTION OF THE PREFERRED EMBODIMENTS

Figure 1:
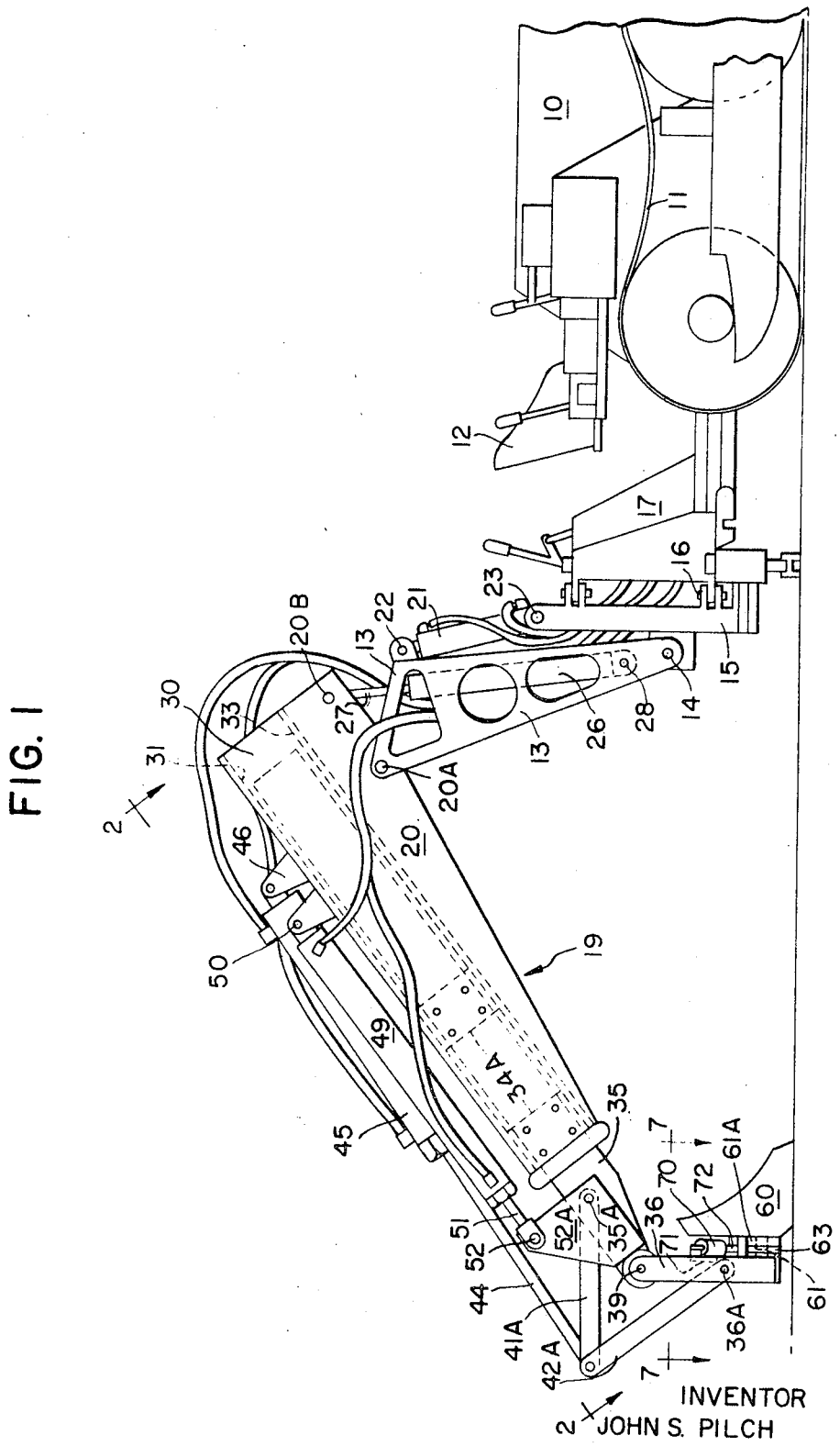
FIG. 1 is a side view of a tractor mounted apparatus including excavating apparatus embodying the invention.

Referring now more particularly to the drawings wherein similar reference characters designate corresponding parts throughout, the invention relates to an excavating apparatus adapted for use with machines such as graders, backhoes and loaders which include an excavating implement such as a grader blade, bucket or loader supported for movement about two axes. In the drawings a grader blade is shown mounted on a tractor, the hydraulic system of which provides hydraulic power for rotating the boom, dipper-stick and grader blade. The tractor shown is of the track type and includes an engine 10, tracks 11, seat 12 and boom 13. The boom 13 is pivotally connected at 14 to a support 15 which in turn is pivotally connected at 16 to a support 17, which is detachably connected to the tractor.

The boom 13 is adapted to be raised and lowered by a hydraulic cylinder 21 connected adjacent its opposite ends at 22 and 23 to boom 13 and support 15 respectively.

Adjacent the upper end of the boom 13 there is pivotally connected a telescopic dipperstick 19 of the type shown in my co-pending application, Ser. No. 864,250 filed Aug. 28, 1969, now U.S. Pat. No. 3,536,217. It comprises a support member 20 pivotally connected to 20A to the boom 13. At 26 there is shown a hydraulic cylinder having a ram 27, the cylinder being coupled at 28 to the boom 13 and the ram being coupled at 20B to the support member 20. The hydraulic cylinder 26 is provided for rotating the dipperstick 19 about the pivot 20A.

Figure 2:
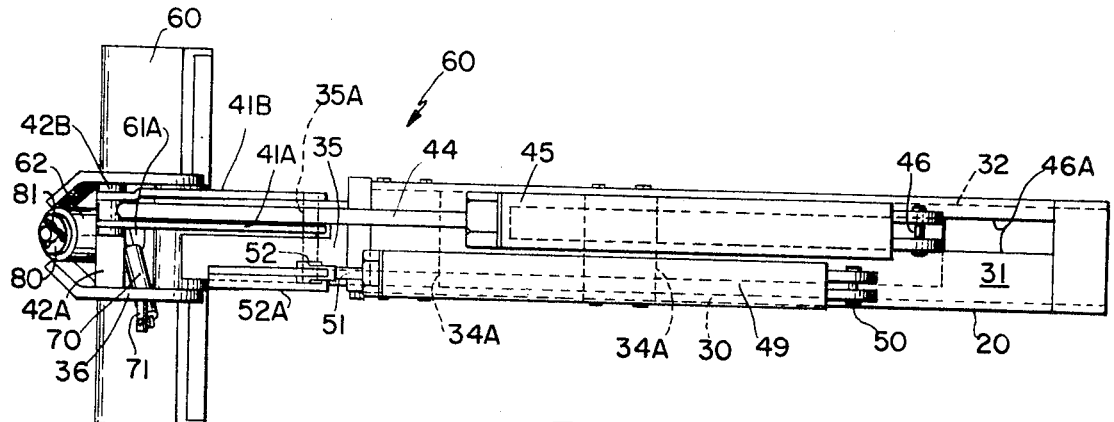
FIG. 2 is an enlarged plan view of the dipperstick and excavating implement looking in the direction of the arrows 2—2 of FIG. 1.

The support member 20 includes a plurality of members shown in FIGS. 1 and 2 at 30, 31, 32 and 33 which are constructed to provide a guide passage having interiorly disposed wear plates shown at 34A. A telescopic member 35 is positioned for slidable movement within the guide passage. At one end of the telescopic member 35 a bracket or excavating implement supporting means 36 is pivotally connected at 39 to the telescopic member 35.

Pivotally mounted linkage means includes links 41A and 41B and links 42A and 42B. Links 41A and 41B are pivotally connected to the telescopic member 35 at 35A and links 42A and 42B are pivotally connected to the bucket supporting means 36 at 36A. The links 41A, 41B, 42A and 42B are pivotally connected together and to the ram 44 of the bucket control cylinder 45. The bucket control cylinder is itself pivotally coupled at one end by a hitch 46 to the telescopic member 35. The hitch 46 extends through the slot 46A (FIG. 2) which is provided in the top wall 31 of the member 20.

It will be noted that the ram 44 as well as the cylinder 45 are positioned off center of the center line of the telescopic member 35 when viewed from the top in FIG. 2 and accordingly the links 41A, 41B, 42A and 42B are constructed such that they are connected to the ram 44 off center from the center line of the telescopic member 35.

In order to move the telescopic member 35 longitudinally within the support member 20 there is provided a hydraulic cylinder 49 which at one end is pivotally coupled at 50 to the member 20. The ram 51 of this hydraulic cylinder is pivotally connected at 52 to the plate 52A which is welded to the telescopic member 35.

Figure 3:
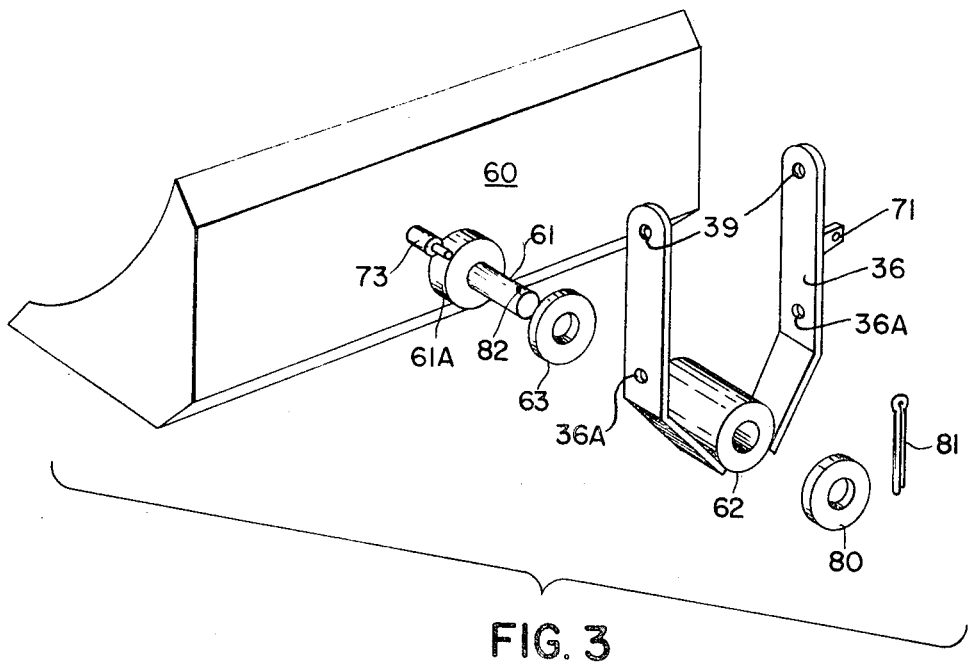
FIG. 3 is an enlarged exploded view of the excavating implement and its supporting means.

The grader blade 60 is provided with a rearwardly extending pin 61 and boss 61A (See FIG. 3). The implement supporting means 36 is provided with a bearing 62 which rotatably receives the pin 61. A thrust washer 63 is located between the boss 61A and the adjacent end of the bearing 62. It is to be noted that the pin 61 is adjacent to the ground line when the leading edge of the grader blade rests on the ground as shown in FIGS. 1 and 4, and that its axis extends in a direction which is substantially normal to the axis of the pivot 39 when the apparatus is viewed from the top. The axis of the pin 61 is also substantially normal to the direction of the leading edge of the grader blade when viewed from the top. In addition the axes of the pin 61 and the pivot 39 are located in planes which are parallel to each other when the supporting means is viewed from the side as in FIG. 1.

The pin 61 is rotatably held in the bearing by the washer 80 and cotter pin 81 which extends through the hole 82 in the pin (FIG. 3).

While the pin 61 is shown secured to the grader blade, it could be secured to the implement supporting means 36 and the bearing 62 secured to the grader blade.

The reciprocating type hydraulic cylinder 70 has one end pivotally secured to the extension 71 on the implement supporting means 36 and the end of its ram 72 pivotally secured to the extension 73 of the grader blade 60.

When the ram of the cylinder 70 is moved longitudinally in one direction, the grader blade is rotated about the pin 61 so it moves from its horizontal position of FIGS. 1 and 4 to the tilted position of FIG. 5 and when the ram is moved longitudinally, in the opposite direction, the grader blade is moved to the tilted position of Fig. 6.

As shown in FIG. 8 at one stage of such rotation, the longitudinal center line of the cylinder and ram is parallel to or coincides with the longitudinal center line of the implement.

As shown in FIGS. 1 and 7, when the leading edge of the excavating implement is horizontal and the implement is viewed from the top, the longitudinal center line of the cylinder and ram is located in a plane which is substantially parallel to the leading edge of the implement.

As shown in FIG. 4, when the leading edge of the excavating implement is horizontal and the implement is viewed from the front, the cylinder and ram are concealed from view and consequently they are protected against contact by the dirt, stones or other material which is being excavated.

The cylinder and ram are so located that, when the leading edge of the excavating implement is horizontal and the implement is viewed from the front as in FIG. 4, the longitudinal center line of the cylinder and ram is tangent to the arc (shown in dot dash) described by the axis of the pivotal attachment of the ram 72 to the excavating implement during rotation of said implement about the second pivot means; compare the positions of this longitudinal centerline as shown in FIGS. 5, 6 and 8.

By comparison of the distances A and B in FIGS. 5 and 6, it will be observed that the power exerted by the cylinder and ram to rotate the excavating implement about the axis of the bearing 62 is reduced only minutely from the maximum power which is exerted when the blade is in the horizontal position of FIG. 4.

While the hydraulic lines to the cylinder 70 are not shown, they are connected to a control valve handle which may be actuated by the operator while sitting on the seat 12 of the vehicle as will be apparent to persons skilled in the art.

While the excavating implement shown in the drawings is a grader blade, the invention is equally useful with a backhoe bucket or a loader bucket.

While a telescopic dipperstick is shown in the drawings, the invention is equally useful with any prior art dipperstick or any other longitudinal member to which an implement supporting means such as 36 may be pivotally attached for movement about an axis which is substantially transverse to the length of the longitudinal member.

While one desirable embodiment of the invention has been shown in the drawings, it is to be understood that this disclosure is for the purpose of illustration only and that various changes in shape, proportion and arrangement of parts as well as the substitution of equivalent elements for those herein shown and described, may be made without departing from the spirit and scope of the invention as set forth in the appended claims.

I claim:

1. In a device of the character described, a longitudinal member,
a excavating implement,
excavating implement supporting means for supporting said excavating implement,
first pivot means connecting the outer end of said longitudinal member with the upper end of said implement supporting means for movement of said implement supporting means about an axis which is substantially transverse to the length of said longitudinal member,
means comprising first hydraulically operated reciprocating means for moving said implement supporting means about said first pivot means,
second pivot means for supporting said excavating implement for movement about an axis which extends in the same vertical plane as the longitudinal direction of said longitudinal member, said second pivot means extending between a lower part of said implement supporting means and a lower part of the rear portion of said implement when the leading edge of said implement rests on the ground, and the axis of said second pivot means being adjacent to and generally parallel to the ground line when the leading edge of said implement rests on the ground, and
means comprising second hydraulically operated reciprocating means for moving said implement about said second pivot means.

2. A device according to claim 1 wherein at least the major portion of said means for moving said implement about said second pivot means is positioned between the rear portion of said excavating implement and the forward portion of said implement supporting means.

3. A device according to claim 1 wherein the axis of said second pivot means is located between the longitudinal center line of said excavating implement and the leading edge thereof when the implement is viewed from the front and when the leading edge of said implement rests on the ground.

4. A device according to claim 1 wherein said means for moving said implement supporting means about said first pivot means comprises a link having one end pivotally attached to said first hydraulically operated reciprocating means and its other end pivotally attached to said implement supporting means at a locality which is between said first and second pivot means.

5. A device according to claim 1 wherein said first pivot means is located adjacent to the upper end of said implement supporting means and the axis of said second pivot means is normal to said implement supporting means and is located adjacent to the lower end thereof.

6. A device according to claim 1 wherein said means for moving said implement supporting means about said first pivot means comprises a link having one end pivotally attached to said first hydraulically operated reciprocating means and its other end pivotally attached to said implement supporting means at a locality which is between said first and second pivot means, the distance between said first pivot means and the pivotal attachment of said link to said implement supporting means being greater than the distance between said pivotal attachment of said link and said second pivot means.

7. A device according to claim 1 wherein said means for moving said implement about said second pivot means comprises third pivot means for attaching one of its ends to said implement supporting means and fourth pivot means for attaching its other end to said excavating implement and said third and fourth pivot means are located between the axis of said first pivot means and said second pivot means when said excavating implement is viewed from the front.

8. A device according to claim 1 wherein said excavating implement and said second hydraulically operated reciprocating means are rotatable to be positioned beneath the longitudinal member during the earth excavating operation.

9. A device according to claim 1 wherein said longitudinal member is supported from a vehicle and wherein said implement and said second hydraulically operated reciprocating means are rotatable to be positioned between said means for supporting said excavating implement and said vehicle during the excavating operation.

* * * * *